(12) United States Patent  (10) Patent No.: US 9,095,237 B2
Khuu  (45) Date of Patent: Aug. 4, 2015

(54) CUTTING BOARD

(71) Applicant: Mango Leaf, Inc., Long Island City, NY (US)

(72) Inventor: Howard Khuu, Long Island City, NY (US)

(73) Assignee: Mango Leaf and Company Inc., Long Island, NY (US)

( * ) Notice: Subject to any disclaimer, the term of this patent is extended or adjusted under 35 U.S.C. 154(b) by 154 days.

(21) Appl. No.: 13/679,585

(22) Filed: Nov. 16, 2012

(65) Prior Publication Data

US 2014/0138893 A1 May 22, 2014

(51) Int. Cl.
*B23Q 3/00* (2006.01)
*A47J 47/00* (2006.01)

(52) U.S. Cl.
CPC ..................... *A47J 47/005* (2013.01)

(58) Field of Classification Search
CPC ............... A47J 47/00; A47J 47/005
USPC ............ 269/13, 289 R, 16, 290, 293, 302.1
See application file for complete search history.

(56) References Cited

U.S. PATENT DOCUMENTS

| | | | | |
|---|---|---|---|---|
| 1,212,040 | A * | 1/1917 | Fletcher | 269/302.1 |
| 1,702,144 | A * | 2/1929 | Weston | 269/302.1 |
| 3,947,012 | A * | 3/1976 | Cobb | 269/289 R |
| 6,478,292 | B1 | 11/2002 | Sellers | |
| 6,695,299 | B1 * | 2/2004 | Brotz | 269/289 R |
| 6,702,273 | B1 | 3/2004 | Sellers | |
| 6,889,969 | B2 * | 5/2005 | Diermeier et al. | 269/289 R |
| 6,910,685 | B2 | 6/2005 | Sellers | |
| 2003/0119937 | A1 | 6/2003 | Patel et al. | |
| 2005/0082732 | A1 * | 4/2005 | Chang | 269/289 R |
| 2005/0253320 | A1 * | 11/2005 | Chang | 269/289 R |
| 2008/0048376 | A1 * | 2/2008 | Farmer et al. | 269/289 R |

FOREIGN PATENT DOCUMENTS

| | | |
|---|---|---|
| JP | 2007/050217 A | 3/2007 |
| JP | 2010/252878 A | 11/2010 |

OTHER PUBLICATIONS

International Search Report and Written Opinion Issued by the U.S. Patent and Trademark Office as International Searching Authority for International Application No. PCT/US2013/070554 mailed Apr. 15, 2014 (9 pgs.).

* cited by examiner

*Primary Examiner* — Lee D Wilson
*Assistant Examiner* — Seahee Yoon
(74) *Attorney, Agent, or Firm* — Cozen O'Connor

(57) ABSTRACT

A cutting board having a removable resilient band is provided. The cutting board includes a planar body defining a top surface, a parallel bottom surface and a uniform width peripheral side. The cutting board also includes a removable resilient band that is configured to engage the periphery of the body. The removable band has a width complementary to the width of the body and defines footings that each has a width greater than the width of the body. The periphery of the body may have a continuous groove and the removable band may have a continuous tongue that fits the groove.

20 Claims, 6 Drawing Sheets

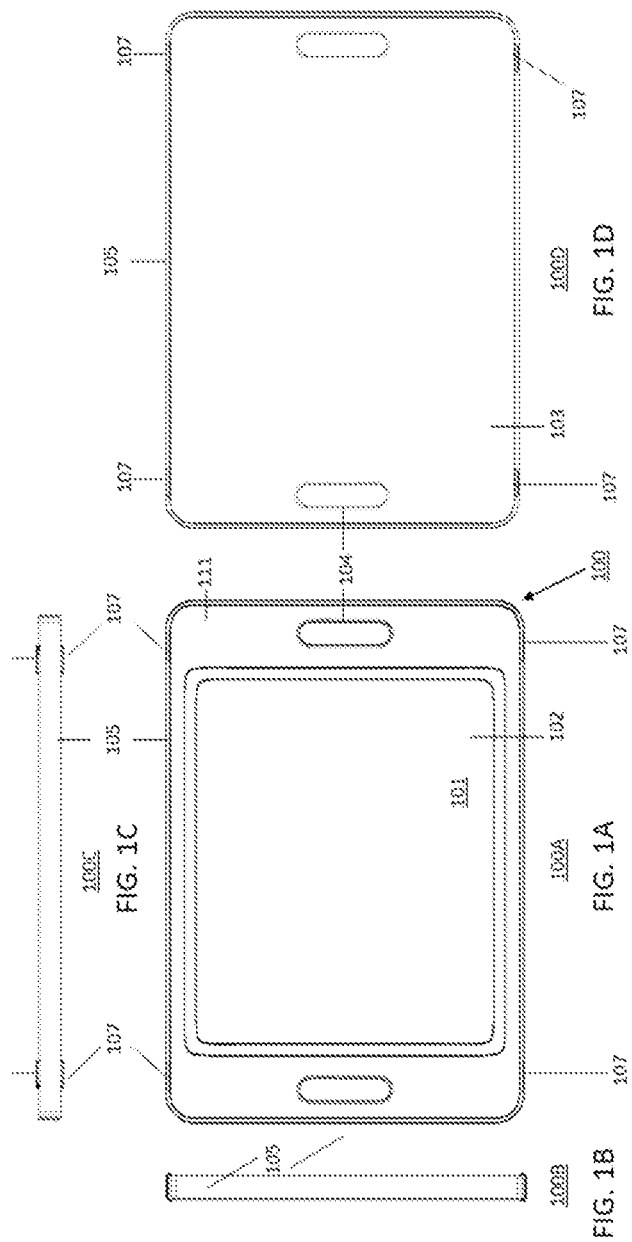

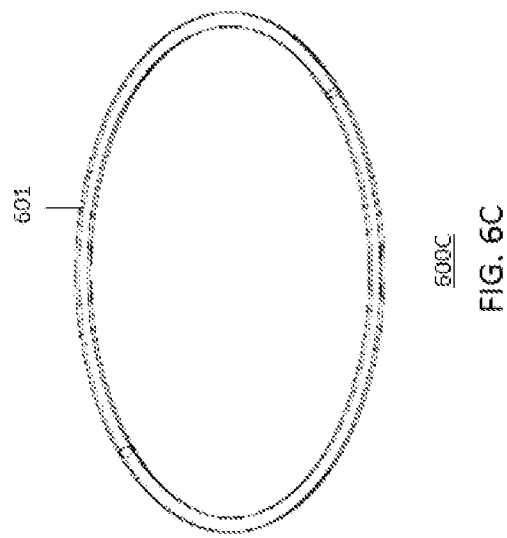
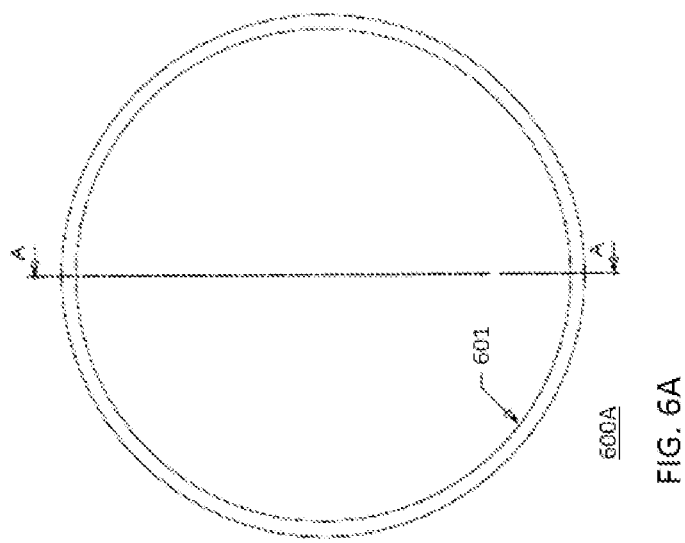
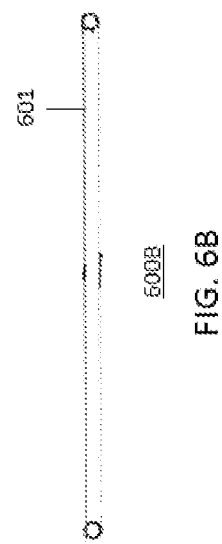
FIG. 6C
600C
FIG. 6A
600A
FIG. 6B
600B
Figure 6A-6C

CUTTING BOARD

FIELD OF DISCLOSURE

This invention generally relates to cutting boards having removable footings. More specifically, this invention relates to a cutting board having a removable, peripheral band which provides removable footings.

BACKGROUND

Cutting boards are well known in the art. They are primarily designed to provide a surface on which to prepare and cut a variety of foods. Many of these boards have two usable surfaces. The surface that is being used faces up and the surface that is not being used faces down towards the counter top that the cutting board is resting on. Some cutting boards have footings on one or both surfaces to provide traction. The footings also raise the unused surface away from the counter top so that juice dripping from cut food will not cause a slippery condition between the unused surface and the counter top.

A disadvantage of many such prior boards is that their footings are permanently attached to the surface of the boards by a variety of methods. This permanence causes a build-up of food particles in the crevices around and between the footing and the board which makes cleaning very difficult. This form of attachment also promotes the growth of bacteria inside the crevices which can spread from these areas, thereby making the surface(s) unsanitary and unsuitable to prepare food on. U.S. Pat. No. 6,702,273 to Sellers demonstrates this disadvantage. Sellers, for example, discusses a wooden cutting board having a plurality of fraction plates that are made of a rigid molded plastic, wherein each traction plate has a plurality of legs having circular attachment disks mounted therein for firm attachment of the fraction plates so that the traction plates will not be removable once inserted. U.S. Pat. No. 6,910,685 and U.S. Pat. No. 6,478,292 disclose other forms of footings that are permanently attached to cutting boards and suffer from the same disadvantage.

Another disadvantage of many such prior boards with permanent footings is that their footings can break down or fall off from the use of detergents through washing by hand or in the dishwasher. If any of the feet are damaged or lost, the cutting boards will be unstable and unsafe to use. For cutting boards with removable footings, the disadvantages are that once the footings are removed, they are prone to being misplaced among a variety of kitchen gadgets and appliances because of their small size. The small footings can also fall into drain holes and be lost during washing and scrubbing. If they are not removed before washing, then they face the disadvantages of cutting board with permanently attached footings. U.S. Pat. No. 6,889,969 B2 to Diermeier, et al. demonstrates these disadvantages with removable footings that can be misplaced when taken off or lost while being washed in the sink, or have the disadvantages of cutting boards with permanently attached footings.

SUMMARY

A cutting board includes a planar body defining a top surface, a parallel bottom surface and a uniform width peripheral side. The cutting board also includes a removable, resilient band that is configured to engage the periphery of the body. The removable band has a width complementary to the width of the body and defines footings that have a width greater than the width of the body.

The removable band of the cutting board may be made of silicone rubber. It may also be made of a polymer or a combination of two or more polymers, including a natural polymer, a synthetic polymer, and an organic polymer. The polymers may be infused with at least one anti-bacterial agent.

The periphery of the body may have a continuous groove. The removable band may have a continuous tongue that can fit the groove. The footings on the removable band may be in rectangular/oblong shape or circular/cylindrical shape.

The bottom parallel surface of the body may be configured to serve as an alternative cutting surface. The body may be in a substantially rectangular shape and define at least one handle. The at least one handle may be defined by at least one oblong aperture within the body.

BRIEF DESCRIPTION OF THE DRAWINGS

FIG. 1A shows a top view of a cutting board having a removable band in accordance with some embodiments of the disclosed subject matter.

FIGS. 1B-1C show side views of a cutting board having a removable band in accordance with some embodiments of the disclosed subject matter.

FIG. 1D shows a bottom view of a cutting board having a removable band in accordance with some embodiments of the disclosed subject matter.

FIGS. 6A-6B respectively show a top view and a cross-section view of a removable band that defines a continuous footing for a cutting board in accordance with some embodiments of the disclosed subject matter.

FIG. 6C shows a perspective view of a removable band that defines a continuous footing for a cutting board in accordance with some embodiments of the disclosed subject matter.

DETAILED DESCRIPTION

Cutting boards having removable footings are provided. In some embodiments of the disclosed subject matter, a cutting board having a removable, peripheral band made of silicon rubber or polymers is provided. The removable band engages the periphery of the cutting board to provide removable footings. The peripheral band can be readily removed, washed and dried for next use.

Figures 2A, 2B:
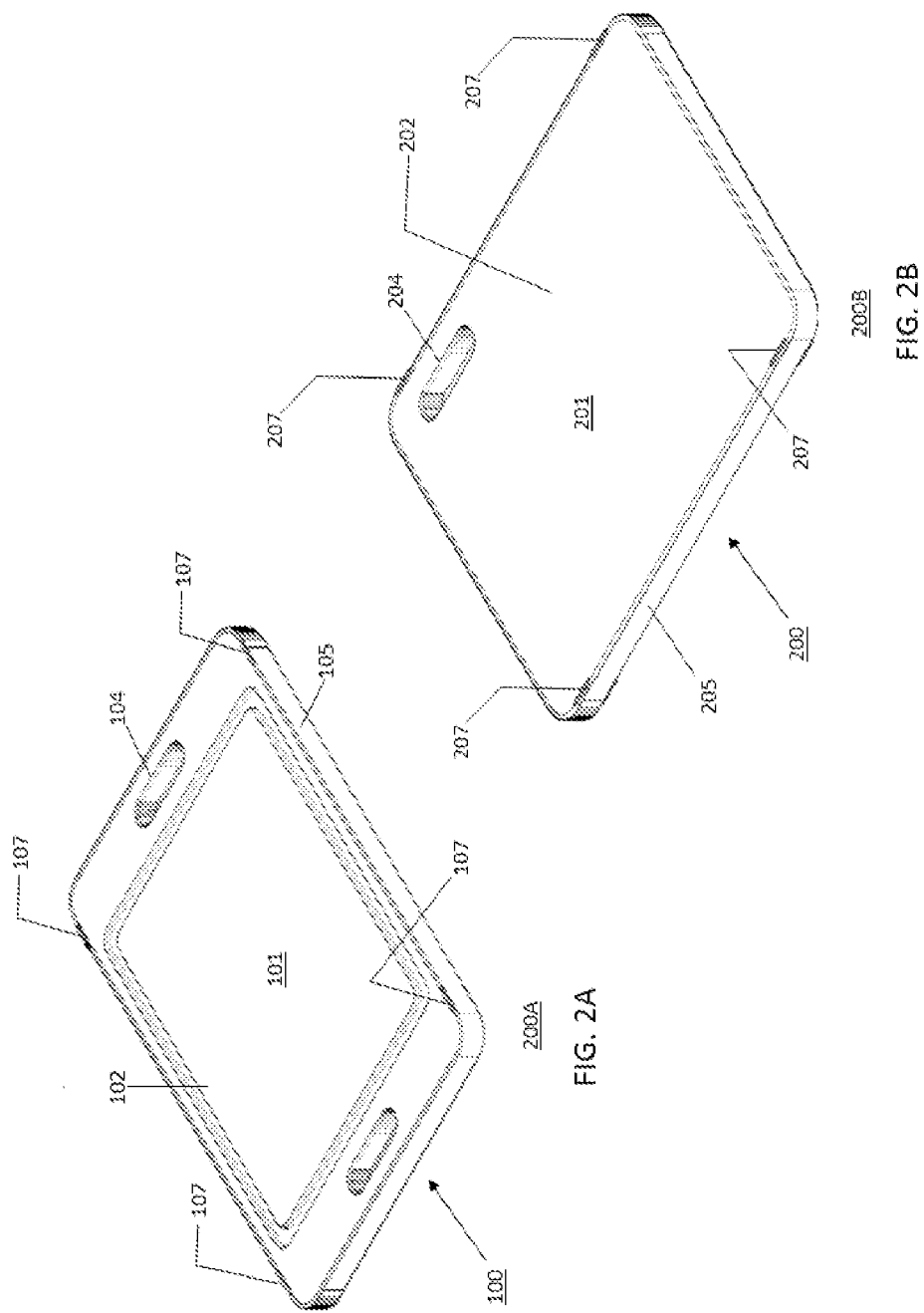
FIG. 2A shows a perspective view of a cutting board having a removable band and a pair of handles in accordance with some embodiments of the disclosed subject matter.
FIG. 2B shows a perspective view of a cutting board having a removable band with an handle in accordance with some embodiments of the disclosed subject matter.

FIGS. 1A-1D illustrate a top view 100A, side views 100B, 100C, and a bottom view 100D, respectively, of a cutting board 100 having a removable, peripheral band in accordance with some embodiments of the disclosed subject matter. Cutting board 100 includes a planar body 101 that defines a top cutting surface 102, a bottom alternate cutting surface 103 and a uniform width peripheral side 111. The peripheral side 111 engages a removable, peripheral band 105 having a width that is complementary to the width of planar body 101. Cutting board 100 may also include a pair of handles 104 that are defined by an oblong aperture at each end of planar body 101. Cutting board 100 can be made of bamboo, wood, plastic, stone, metal and any other suitable material, or any combination thereof. FIG. 2A illustrates a perspective view 200A of cutting board 100 with removable band 105 and planar body 101 that in turn defines top surface 102, bottom surface 103, handles 104 and peripheral side 111. A cutting board having a removable band can be made in various sizes, shapes and colors. It can also include one or more handles of various types, forms, size, and shapes.

Removable band 105 engages peripheral side 111 (shown in FIGS. 1 and 3) and can be readily removed for washing and drying. In some embodiments, removable band 105 is made of silicone rubber, but can also be made of natural polymer, synthetic polymer, organic polymer or any combination of the polymers. These band materials give some elasticity to removable band 105 for tight fit to, and easy disengagement from, the peripheral side 111. An anti-bacterial agent may be infused into the polymers to give a removable band for a cutting board, such as removable band 105, an enhanced bacterial resistance.

Removable band 105 has no hard to reach crevices that can harbor food residue and hence affords easy cleaning. For example, a removable band made of silicone rubber, such as removable band 105, is dishwasher safe for easy cleaning. Removable band 105 can be made in various sizes, shapes and colors for enhanced visibility and aesthetic appeals. Removable band 105 can provide grips on all sides and act as a bumper, thereby protecting a counter top, appliance and floor from nicks and dents.

As shown, the removable band 105 defines a set of four rectangular/oblong shape footings 107. Footings 107 each has a width that is greater than the width of planar body 101. Footings 107 can provide, among other things, a tight grip on both cutting surface 102 and bottom surface 103, which may be used as an alternative cutting surface. As will be shown in FIGS. 5-6, however, footings for a cutting board that are defined by a removable band can have various sizes and shapes. There may be any number of such footings and the removable band may have the footings placed in various intervals. The footings can be on one or both edges of the removable band. They can also be on one or both sides of the removable band. In some embodiments, a footing can run continuously around a removable band, such as the removable band 105.

FIG. 2B illustrates a perspective view 200B of a cutting board 200 having removable band and a handle in accordance with some embodiments of the disclosed subject matter. Cutting board 200 includes a planar body 201 that defines a top cutting surface 202, a bottom surface 203 (not shown), and a handle 204. Cutting board 200 also includes a removable band 205 that defines a set of footings 207. Removable band 205 may have substantially the same characteristics (e.g., materials, sizes, shapes, etc.) as removable band 105. A set of two or more cutting boards of different shapes, materials, and purposes may be made to be used with a same, or substantially same, removable band.

Figure 3:
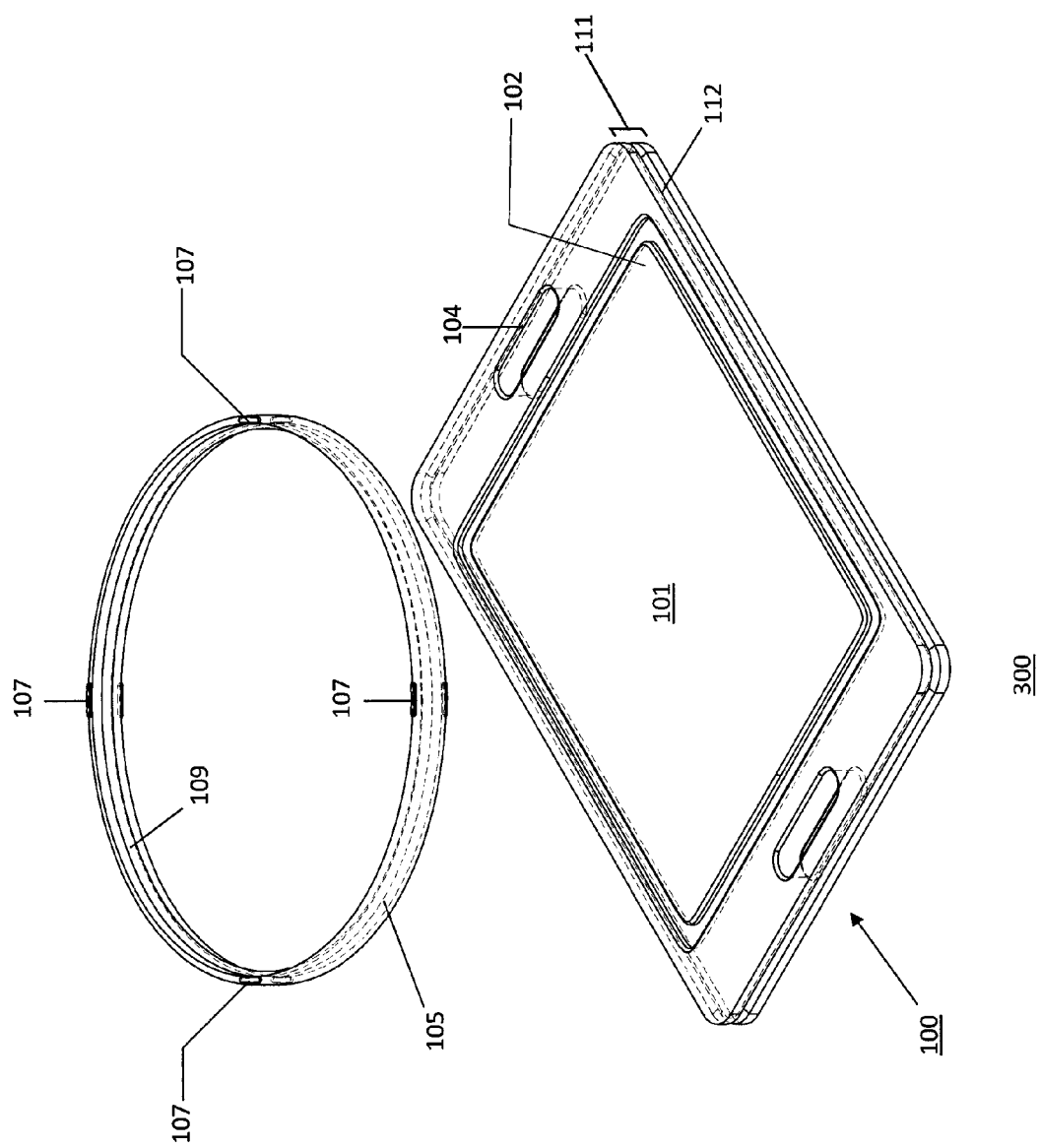
FIG. 3 shows an exploded view of a cutting board having a removable band in accordance with some embodiments of the disclosed subject matter.

FIG. 3 illustrates an exploded view 300 of cutting board 100 in accordance with some embodiments of the disclosed subject matter. As discussed in reference to FIGS. 1 and 2A,
cutting board 100 includes a planar body 101 that defines top cutting surface 102, bottom surface 103 (not shown), peripheral side 111, and handles 104. Cutting board 100 also includes removable band 105 that defines a set of footings 107. Cutting board 100 also includes grooves 112 and removable band 105 also includes tongues 109. Tongues 109 and grooves 112 can be used to, e.g., hold tighter together removable band 105 and peripheral side 111. In some embodiments, peripheral side 111 has tongues and removable band 105 has grooves. Tongues and grooves of any size, shape or form may be used for fitting a removable band to a cutting board. Tongues 109 and grooves 112 may be on removable band 105 and cutting board 100, respectively, either in a continuous manner or in repeated intervals of any given amount. Removable band 105 continually and completely wraps peripheral side 111.

Figures 4A, 4B:
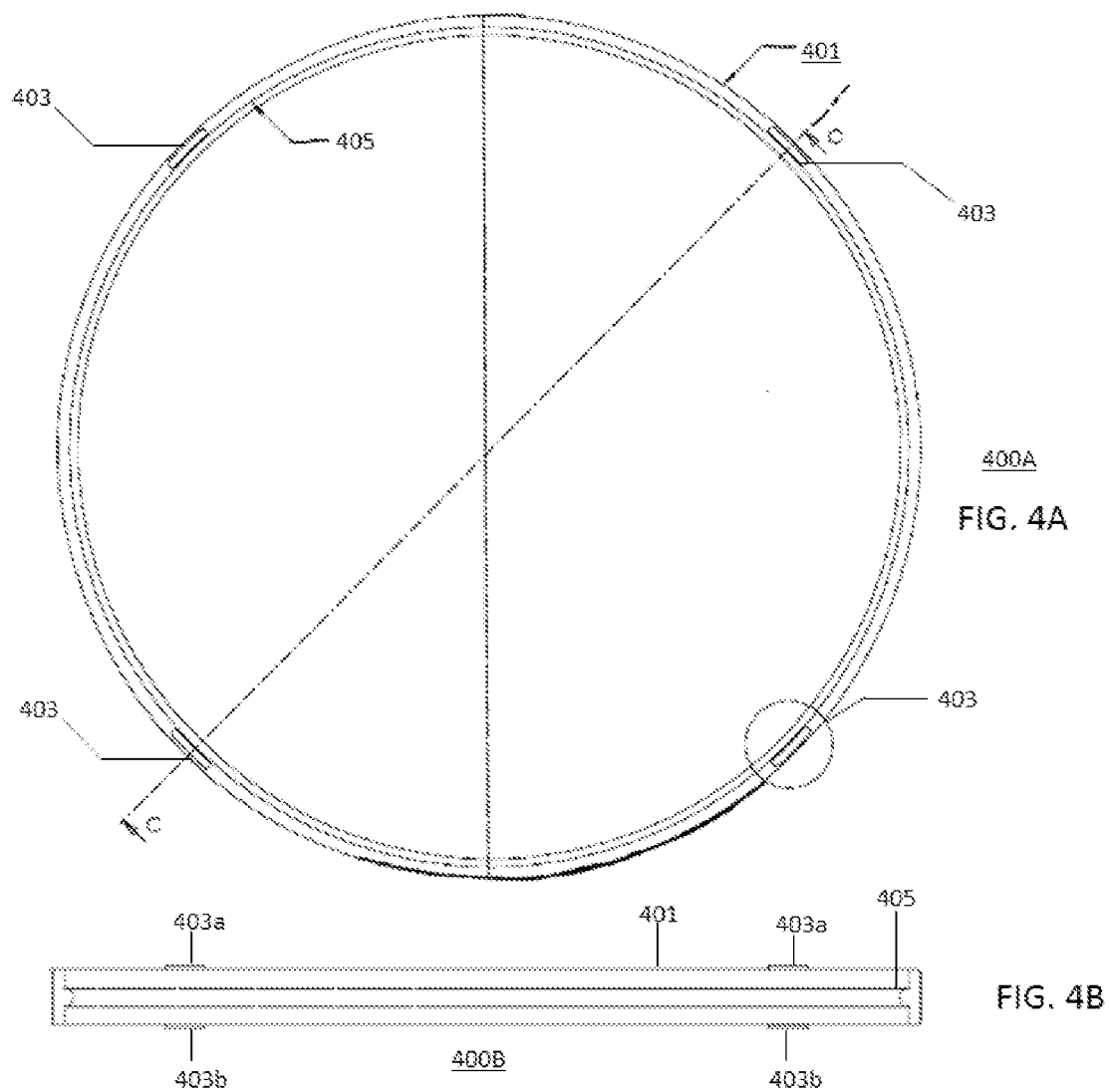
FIGS. 4A-4B respectively show a top view and a cross-section view of a removable band that defines four rectangular footings for a cutting board in accordance with some embodiments of the disclosed subject matter.

FIGS. 4A-4B illustrate a top view 400A and a cross-section view 400B of removable band 401 that define four rectangular footings for a cutting board in accordance with some embodiments of the disclosed subject matter. Removable band 401 defines a set of rectangular shape footings 403 and a tongue 405. In some embodiments, removable band 401 is made of silicon rubber. Silicone rubber, as with any other polymer, may be made to possess no odor or taste and to be safe for use in connection with food. Removable band 401 may be also made of a polymer (e.g., natural, synthetic, organic, etc.) or a combination of two or more polymers. Removable band 401 can also use color codes that can help prevent cross contamination.

Footings 403 provide a tight grip against a countertop for a cutting board that uses removable band 401. Footings 403a, 403b are found on both edges of removable band 401. In some embodiments, however, footings included on a removable band may be on only one edge (403a or 403b) of the band. They may be also on one or both edges of the removable band.

Figures 5A, 5B, 5C:
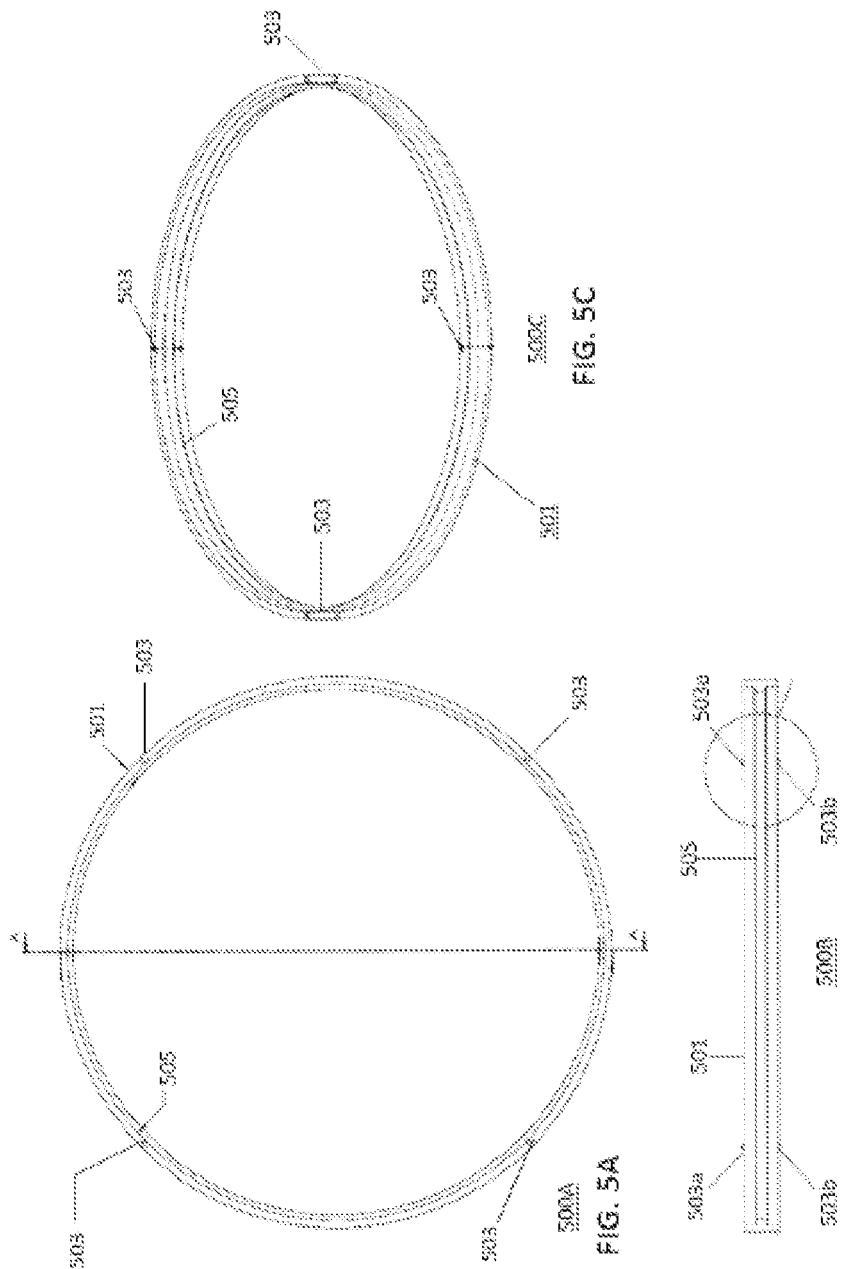
FIGS. 5A-5B respectively show a top view and a cross-section view of a removable band that defines four circular shape footings for a cutting board in accordance with some embodiments of the disclosed subject matter.
FIG. 5C shows a perspective view of a removable band that defines four circular shape footings for a cutting board in accordance with some embodiments of the disclosed subject matter.

FIGS. 5A-5C illustrate a top view 500A, a cross-section view 500B, and a perspective view 500C, respectively, of a removable band 501 that defines four semi-spherical shape footings for a cutting board in accordance with some embodiments of the disclosed subject matter. Removable band 501 defines a set of semi-spherical shape footings 503 and a tongue 505. Footings 503 (503a, 503b) may be also in spherical or cylindrical shape. Removable band 501 may also have more or less than four footings 503. Removable band 501 may be made of a polymer or a combination of polymers that is infused with one or more anti-bacterial agents.

FIGS. 6A-C illustrate a top view 600A, a cross-section view 600B, and a perspective view 600C, respectively, of a removable band 601 that defines a continuous footing for a cutting board in accordance with some embodiments of the disclosed subject matter. Removable band 601 acts as a removable footing having a width that is uniformly greater than the width of a peripheral side of a cutting board (e.g., cutting board 100) that can be configured to use removable band 601. Because removable band 601 can act as a raised peripheral boundary around a cutting surface while at the same time functioning as a footing, a cutting board that is configured to use removable band 601 can prevent juice dripping from cut food from reaching a countertop or other surface on which the cutting board rests.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A cutting board comprising:
a planar body defining a top surface, a parallel bottom surface and a uniform width peripheral side having a groove or tongue; and
a removable resilient band having the other of the groove or tongue and configured to engage, by tongue and groove engagement, the peripheral side of said body, the removable band being arranged around the entire periphery of said body
and defining an upper edge proximate the top surface and a lower edge proximate the bottom surface, wherein at least one of: (i) the upper edge comprises upper footings projecting beyond the upper edge of the removable band and (ii) the lower edge comprises lower footings projecting beyond the lower edge of the removable band; the footings arranged such that when the cutting board is disposed on a support surface, the footings securely position the cutting board on the support surface and position the body above the support surface.

2. The cutting board of claim 1, wherein said removable band is made of silicone rubber.

3. The cutting board of claim 1, wherein said removable band is made of one of: natural polymer, synthetic polymer, organic polymer, or any combination thereof.

4. The cutting board of claim 1, wherein said removable band is made of a material that is infused with at least one anti-bacterial agent.

5. The cutting board of claim 1, wherein the peripheral side of said body has a continuous groove and said removable band has a continuous tongue that fits the groove.

6. The cutting board of claim 1, wherein the peripheral side of said body has a continuous tongue and said removable band has a continuous groove that receives the tongue.

7. The cutting board of claim 1, wherein the peripheral side of said body has a plurality of grooves in repeated intervals and said removable band has a plurality of tongues in repeated corresponding intervals matching the intervals of the grooves to fit the grooves.

8. The cutting board of claim 1, wherein the footings have one of a rectangular shape or an oblong shape.

9. The cutting board of claim 1, wherein the footings are defined at the upper edge and lower edge of said removable band.

10. The cutting board of claim 9, wherein the footings projecting beyond the upper edge of the removable band are in alignment with the footings projecting beyond the lower edge of the removable band.

11. The cutting board of claim 1, wherein said body is in a substantially rectangular shape.

12. The cutting board of claim 11, wherein said removable band engages the peripheral side of said body such that the footings are located on only two parallel sides of the cutting board.

13. The cutting board of claim 11, wherein said removable band engages the peripheral side of said body such that the footings are located on all four sides of the cutting board.

14. The cutting board of claim 11, wherein four corners of said substantially rectangular shaped body each has a groove and said removable band has tongues for fitting the corner grooves.

15. The cutting board of claim 1, wherein said body further defines at least one handle.

16. The cutting board of claim 15, wherein the at least one handle is defined by at least one oblong aperture within said body.

17. The cutting board of claim 1, wherein the bottom parallel surface is configured to serve as an alternative cutting surface.

18. The cutting board of claim 1, wherein the footings are defined on said removable band in regular intervals.

19. The cutting board of claim 1, wherein said removable band using color codes.

20. The cutting board of claim 1, wherein the footings projecting beyond one of the upper edge and lower edge of the removable band are equidistantly spaced from one another.

* * * * *